US010788095B2

(12) United States Patent
Shahan et al.

(10) Patent No.: US 10,788,095 B2
(45) Date of Patent: Sep. 29, 2020

(54) FLUID AND ELASTOMER VIBRATION ISOLATOR

(71) Applicant: HRL LABORATORIES, LLC, Malibu, CA (US)

(72) Inventors: David W. Shahan, Los Angeles, CA (US); Sloan P. Smith, Moorpark, CA (US); Adam E. Sorensen, Moorpark, CA (US); Casey J. Sennott, Calabasas, CA (US); Christopher P. Henry, Thousand Oaks, CA (US); Geoffrey P. McKnight, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 15/957,202

(22) Filed: Apr. 19, 2018

(65) Prior Publication Data
US 2018/0372180 A1 Dec. 27, 2018

Related U.S. Application Data

(60) Provisional application No. 62/524,941, filed on Jun. 26, 2017.

(51) Int. Cl.
*F16F 15/027* (2006.01)
*F16F 15/02* (2006.01)
(Continued)

(52) U.S. Cl.
CPC .......... *F16F 15/0275* (2013.01); *E21B 12/00* (2013.01); *F16F 13/10* (2013.01);
(Continued)

(58) Field of Classification Search
CPC ... F16D 25/14; F16F 9/42; F16F 13/10; F16F 15/022; F16F 15/0275
(Continued)

(56) References Cited

U.S. PATENT DOCUMENTS 3,137,466 A 6/1964 Rasmussen
4,576,366 A * 3/1986 Gallas ................... F16F 13/08
188/268

(Continued)

FOREIGN PATENT DOCUMENTS

JP 10-252829 A 9/1998
JP 10-331907 A 12/1998
JP 2005-009626 A 1/2005

OTHER PUBLICATIONS

International Search Report and Written Opinion dated Jul. 31, 2018 for corresponding Application No. PCT/US2018/028299 (14 pages).

*Primary Examiner* — Christopher P Schwartz
(74) *Attorney, Agent, or Firm* — Lewis Roca Rothgerber Christie, LLP (57) ABSTRACT

An isolator configured to isolate a payload from unwanted vibrations and shocks. The isolator includes a housing having a first end and a second end opposite the first end, a primary chamber defined in the housing, a backpressure chamber defined in the housing, a conduit placing the primary chamber in fluid communication with the backpressure chamber, a backpressure membrane in the housing proximate the first end, an elastomer dome in the housing proximate the second end, and a shaft connected to the elastomer dome. The primary chamber and the backpressure chamber are between the backpressure membrane and the elastomer dome. The shaft is configured to be connected to the payload.

19 Claims, 4 Drawing Sheets
(1 of 4 Drawing Sheet(s) Filed in Color)

(51) Int. Cl.
  *F16F 13/10* (2006.01)
  *F16F 15/00* (2006.01)
  *E21B 12/00* (2006.01)
(52) U.S. Cl.
  CPC .......... *F16F 15/002* (2013.01); *F16F 15/022* (2013.01); *F16F 2222/12* (2013.01); *F16F 2224/025* (2013.01); *F16F 2224/048* (2013.01)
(58) Field of Classification Search
  USPC ... 267/267, 267.1, 267.2, 33–35, 64.11, 118, 267/122, 140.11–140.13
  See application file for complete search history.

(56) References Cited

U.S. PATENT DOCUMENTS

| | | | |
|---|---|---|---|
| 4,583,723 A * | 4/1986 | Ozawa | F16F 13/26 |
| | | | 188/267 |
| 4,657,227 A * | 4/1987 | Hofmann | F16F 13/10 |
| | | | 267/140.13 |
| 4,779,852 A | 10/1988 | Wassell | |
| 4,787,610 A * | 11/1988 | Kojima | F16F 13/20 |
| | | | 188/317 |
| 4,858,733 A * | 8/1989 | Noguchi | B60N 2/505 |
| | | | 188/267.1 |
| 4,895,353 A | 1/1990 | Roth et al. | |
| 4,962,915 A | 10/1990 | Thorn | |
| 5,180,145 A * | 1/1993 | Watanabe | F16F 9/103 |
| | | | 188/267.1 |
| 5,251,883 A * | 10/1993 | Simon | B64C 27/001 |
| | | | 188/267 |
| 5,267,726 A | 12/1993 | Takeo et al. | |
| 5,366,048 A * | 11/1994 | Watanabe | F16F 9/0472 |
| | | | 188/267.1 |
| 5,477,946 A * | 12/1995 | Kawamata | F16F 9/103 |
| | | | 188/267.1 |
| 5,489,009 A * | 2/1996 | Kawamata | F16F 9/103 |
| | | | 188/267.1 |
| 5,516,084 A | 5/1996 | Rizzo | |
| 5,601,164 A * | 2/1997 | Ohsaki | B60G 17/002 |
| | | | 188/264 CC |
| 5,667,203 A * | 9/1997 | Romer | B60G 15/12 |
| | | | 188/322.16 |
| 5,878,851 A * | 3/1999 | Carlson | F16F 9/067 |
| | | | 188/267 |
| 6,352,249 B2 * | 3/2002 | Muramatsu | F16F 13/268 |
| | | | 267/140.14 |
| 6,386,134 B1 | 5/2002 | Monson et al. | |
| 6,565,061 B1 | 5/2003 | Petersen et al. | |
| 8,152,145 B2 * | 4/2012 | Anderson | F16F 1/361 |
| | | | 188/267.2 |
| 8,240,401 B2 * | 8/2012 | Wassell | E21B 17/073 |
| | | | 175/322 |
| 8,540,221 B2 * | 9/2013 | Watanabe | F16F 9/0454 |
| | | | 267/64.24 |
| 2003/0178267 A1 * | 9/2003 | Doyle | F16F 9/067 |
| | | | 188/297 |
| 2008/0237952 A1 * | 10/2008 | Nishi | F16F 13/10 |
| | | | 267/140.13 |
| 2009/0079117 A1 * | 3/2009 | Adams | F16F 13/268 |
| | | | 267/140.14 |
| 2011/0193275 A1 * | 8/2011 | Russell | B64C 27/001 |
| | | | 267/140.13 |
| 2012/0091640 A1 * | 4/2012 | Ogawa | F16F 13/101 |
| | | | 267/140.11 |
| 2012/0248668 A1 * | 10/2012 | Umemura | F16F 13/107 |
| | | | 267/140.11 |
| 2013/0206395 A1 | 8/2013 | Cramer | |

* cited by examiner

FLUID AND ELASTOMER VIBRATION ISOLATOR

CROSS-REFERENCE TO RELATED APPLICATION

The present application claims priority to and the benefit of U.S. Provisional Application No. 62/524,941, entitled "Combined Fluid and Elastomer Vibration Isolator," filed Jun. 26, 2017, the entire content of which is incorporated herein by reference.

FIELD

The present disclosure relates generally to fluid and elastomer vibrations isolators.

BACKGROUND

A variety of different types of isolators are commonly utilized to isolate sensitive components, such as a sensor chassis in a drill pipe or an electronics suite in a missile, from unwanted vibrations and/or shocks. Related art isolators include mechanical snubbers, solid elastomer mounts or barriers, hydraulic engine mounts, and bushings. However, these related art isolators may provide relatively low levels of vibration isolation due to the relatively small amount of travel of the isolator and/or the inherent material properties of the isolator. Additionally, some related art isolators may be configured to attenuate vibrations in only one primary direction, such as an axial direction.

SUMMARY

The present disclosure is directed to various embodiments of an isolator configured to isolate a payload from unwanted vibrations and shocks. In one embodiment, the isolator includes a housing having a first end and a second end opposite the first end, a primary chamber defined in the housing, a backpressure chamber defined in the housing, a conduit placing the primary chamber in fluid communication with the backpressure chamber, a backpressure membrane in the housing proximate the first end, an elastomer dome in the housing proximate the second end, and a shaft connected to the elastomer dome. The primary chamber and the backpressure chamber are between the backpressure membrane and the elastomer dome. The shaft is configured to be connected to the payload.

When vibrations or a shock are transmitted to the housing, the elastomer dome deflects to attenuate the vibrations or the shock reaching the payload through the shaft, the deflection of the elastomer dome forces a volume of the liquid in the primary chamber through the conduit into the backpressure chamber, and an influx of the volume of the liquid into the backpressure chamber deflects the backpressure membrane. The deflection of the backpressure membrane generates a restorative force configured to force a volume of the liquid in the backpressure chamber into the primary chamber through the conduit.

The housing may include a partition separating the primary chamber from the backpressure chamber. The conduit may be an opening defined in the partition. The isolator may include a liquid contained in the primary chamber and the backpressure chamber. The liquid in the primary chamber and the backpressure chamber may be oil, such as mineral oil. The backpressure membrane may include a resilient material, such as silicone elastomer. The isolator may include a lateral bump stop connected to the second end of the housing. The lateral bump stop extends inward from the housing toward the shaft. The isolator may also include an axial bump connected to the housing.

The present disclosure is also directed to various methods of isolating a payload from unwanted vibrations and shocks. In one embodiment, the method includes deforming an elastomer dome disposed between a vibration source and the payload to provide multi-axis damping, and pumping a volume of liquid from a first chamber to a second chamber through a conduit with the elastomer dome to provide fluidic damping.

The method may include pumping a volume of the liquid from the second chamber to the first chamber with a backpressure membrane. The liquid may be mineral oil.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale. Additionally, the patent or application file contains at least one drawing executed in color. Copies of this patent or patent application publication with color drawing(s) will be provided by the Office upon request and payment of the necessary fee.

DETAILED DESCRIPTION

The present disclosure is directed to various embodiments of an isolator. In one or more embodiments, the isolator is configured to provide both multi-axis elastomeric damping and fluidic damping (e.g., hydraulic damping) to attenuate vibrations and thereby isolate a payload from unwanted vibrations. The isolators of the present disclosure may be utilized to isolate a variety of different payloads, such as a sensor chassis in a hydrocarbon drill well or an electronics suite in a missile, from unwanted vibrations and/or shocks, which might otherwise damage or inhibit proper performance of the payload.

Figure 1:
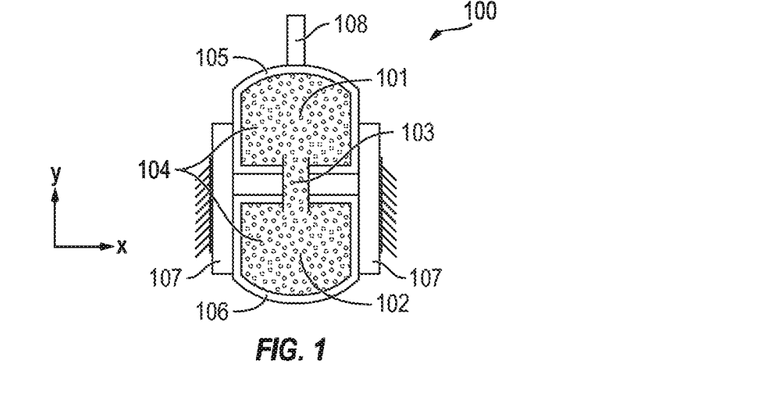
FIG. 1 is a schematic cross-sectional view of an isolator according to one embodiment of the present disclosure.

With reference now to FIG. 1, an isolator 100 according to one embodiment of the present disclosure includes a first chamber 101 (e.g., a primary chamber), a second chamber 102 (e.g., a backpressure chamber), and a conduit 103 extending between the first and second chambers 101, 102. The isolator 100 also includes a liquid 104 (e.g., an oil such as mineral oil) contained in the first and second chambers 101, 102. The conduit 103 defines a fluid path (e.g., a fluid track) placing the first chamber 101 in fluid communication with the second chamber 102 such that the liquid 104 can flow between the first and second chambers 101, 102. Although in the illustrated embodiment the first chamber 101 is in-line (e.g., aligned) with the second chamber 103, in one or more embodiments, the first and second chambers 101, 102 may have any other suitable relative positions (e.g., the first and second chambers 101, 102 may be misaligned or offset from each other).

In the illustrated embodiment, the isolator 100 also includes an elastomer dome 105 at least partially surrounding the first chamber 101 (e.g., the elastomer dome 105 defines at least a portion of the first chamber 101), and a backpressure membrane 106 at least partially surrounding the second chamber 102 (e.g., the backpressure membrane 106 defines at least a portion of the second chamber 102). In the illustrated embodiment, the elastomer dome 105 and the backpressure membrane 106 are each dome-shaped members extending in opposite directions away from each other. In one or more embodiments, the backpressure membrane 106 may have any other suitable configuration (e.g., the backpressure membrane 106 may not be dome-shaped). In one or more embodiments, the elastomer dome 105 and the backpressure membrane 106 are each made out of a resilient (e.g., elastic) material. In one or more embodiments, the elastomer dome 105 and the backpressure membrane 106 may each be made out of any suitable type or kind of elastomer, such as silicone elastomers (e.g., NuSil™ 5840), ethylene propylene rubber (EPM), ethylene propylene diene rubber (EPDM), ethylene-vinyl acetate EVA), thermoplastic elastomers (TPE), natural polyisoprene, synthetic polyisoprene, Buna-N rubber (nitrile rubber), or combinations thereof.

With continued reference to the embodiment illustrated in FIG. 1, the isolator 100 also includes a base 107 coupled to the elastomer dome 105 and the backpressure membrane 106. The base 107 is configured to facilitate attaching the isolator 100 to any component or components in an environment in which the isolator 100 will be utilized to attenuate unwanted vibrations and/or shocks. Additionally, in the illustrated embodiment, the isolator 100 includes a shaft 108 connected to the elastomer dome 105. The shaft 108 is configured to be connected to a payload, and the isolator 100 is configured to isolate the payload from unwanted vibrations and/or shocks transmitted to the base 107 of the isolator 100 from a source of vibrations and/or shocks (i.e., the isolator 100 is configured to attenuate the transmission of unwanted vibrations and/or shocks from the source to the payload connected to the shaft 108). The payload may be any component or components that is desired to be isolated from unwanted vibrations and/or shocks, such as, for instance, a sensor chassis or an electronics suite, and the source of the vibrations and/or shocks may be any component or components in the environment in which the payload is present, such as, for instance, a missile body or the pressure casing and/or the drill string of a petroleum drill well.

In operation, movement of the base 107 caused by vibrations and/or a shock transmitted to the base 107 of the isolator 100 causes the elastomer dome 105 to deflect (e.g., deform), which reduces or limits transmission of the vibrations and/or the shock to the payload connected to the shaft 108. That is, the elastomer dome 105 effectively decouples the shaft 108 from the base 107 to reduce the transmission of vibrations and/or a shock to the payload connected to the shaft 108. In the illustrated embodiment, the elastomer dome 105 is configured to deflect both radially (i.e., the x-direction in FIG. 1) and axially (i.e., the y-direction in FIG. 1) to provide vibration isolation in all translational directions. In this manner, the elastomer dome 105 is configured to provide multi-axis damping to attenuate the transmission of the vibrations and/or the shock to the isolated payload through the shaft 108. In the illustrated embodiment, the elastomer dome 105 is also configured to deflect rotationally about the axial direction (i.e., rotationally around the y-axis in FIG. 1) to provide vibration isolation in a rotational direction. The configuration of the elastomer dome 105 (e.g., the geometry of the elastomer dome 105, including the shape, size, and thickness of the elastomer dome 105) and the material properties of the elastomer dome 105 (e.g., the material, hardness (durometer), and stiffness of the elastomer dome) may be selected depending on the magnitude of the vibrations and/or the shock input to the base 107 from the vibration source and/or the desired degree of vibrational isolation provided to the payload connected to the shaft 108.

Additionally, when vibrations and/or a shock (or at least a component thereof) is imparted to the base 107 along the axial direction of the base 107 (e.g., the positive y-direction in FIG. 1), at least a portion the elastomer dome 105 deflects axially in the opposite direction (e.g., at least a portion of the elastomer dome 105 deflects in the negative y-direction in FIG. 1). The deflection of the elastomer dome 105 in the axial direction (e.g., the negative y-direction in FIG. 1) reduces the volume of the first chamber 101 and thereby increases the pressure of the liquid 104 in the first chamber 101. A volume of liquid 104 in the first chamber 101 corresponding to the volume of liquid 104 in the first chamber 101 that was displaced by the deflection or deformation of the elastomer dome 105 is forced through the conduit 103 into the second chamber 102. In this manner, the elastomer dome 105 is configured to function as a piston to pump a volume of the fluid 104 in the first chamber 101 to the second chamber 102 through the conduit 103 in response to vibrations and/or a shock imparted to the base 107 of the isolator 100. In one or more embodiments, the stiffness of the elastomer dome 105 is sufficiently soft to provide multi-axis damping, but stiff enough to pump the volume of the liquid 104 from the first chamber 101 to the second chamber 102 through the conduit 103. In one or more embodiments, the isolator 100 may include one or more mechanisms (not shown) for deflecting at least a portion of the elastomer dome 105 axially (e.g., in the negative y-direction) and thereby pumping a volume of the liquid 104 into the second chamber 102 when a rotational force (e.g., a rotational force about the y-axis) is imparted to the base 107, such as, for instance, a shaft passing through a threaded fitting that shortens the shaft and thereby compresses the elastomer dome 105 when the shaft rotates and/or an arm attached radially to the axis and offset from the elastomer dome 105 such that rotation causes the arm to compress the elastomer dome 105.

The backpressure membrane 106 is configured to deflect and/or deform in the axial direction (e.g., the negative y-direction in FIG. 1) in response to the influx of additional liquid 104 into the second chamber 102 (e.g., the backpressure membrane 106 is configured to expand axially, which increases the size of the second chamber 102 to accommodate the influx of additional liquid 104). The deflection and/or deformation of the backpressure membrane 106 in the axial direction due to the influx of an additional volume of the liquid 104 into the second chamber 102 provides fluidic damping (e.g., hydraulic damping) along the axial direction (e.g., the y-axis in FIG. 1) of the shaft 108.

Additionally, in the illustrated embodiment, the cross-sectional size of the conduit 103 is smaller than the cross-sectional size of each of the first and second chambers 101, 102 such that the conduit 103 restricts the flow of the liquid 104 between the first chamber 101 and the second chamber 102. This restriction of the liquid flow through the conduit 103 is configured to provide fluidic damping to limit the transmission of vibrations and/or shock to the payload connected to the shaft 108. The configuration (e.g., shape and size) of the conduit 103 may be selected depending on the magnitude of the vibrations and/or shock input to the base 107 from the vibration source and/or the desired level of fluidic damping.

Additionally, the deflection and/or deformation of the backpressure membrane 106, which is formed of a resilient (e.g., elastic) material, generates a restorative force in an axial direction (e.g., the positive y-direction in FIG. 1) opposite to the direction in which the backpressure membrane 106 was deflected and/or deformed. This restorative force is configured to force (e.g., pump) a volume of the liquid 104 in the second chamber 102 back through the conduit 103 into the first chamber 101. The restorative force supplied by the deflected backpressure membrane 106 is configured to force a volume of the liquid 104 into the first chamber 101 through the conduit 103 until the pressure of the liquid 104 in the first chamber 101 is equal or substantially equal to the pressure of the liquid 104 in the second chamber 102 (i.e., the deflection and/or deformation of the backpressure membrane 106 is configured to change the pressure of the liquid 104 in the second chamber 102 until a pressure equilibrium or substantially a pressure equilibrium is reached between the liquid 104 in the first chamber 101 and the second chamber 102). This cycle of pumping the liquid 104 between the first chamber 101 and the second chamber 102 through the conduit 103 may continue as long as unwanted vibrations and/or shocks are input to the base 107 of the isolator 100 in order to provide fluidic damping to attenuate the transmission of the vibrations and/or the shocks to the isolated payload.

Accordingly, the embodiment of the isolator 100 illustrated in FIG. 1 is configured to provide both multi-axis isolation (e.g., translational and rotational vibration isolation) due to the elastomer dome 105 being coupled between the base 107 and the shaft 108, and fluidic damping (e.g., hydraulic damping) along the axial direction (e.g., the y-axis in FIG. 1) due to the pumping of the fluid between the first and second chambers 101, 102 through the conduit 103.

Figure 2A:
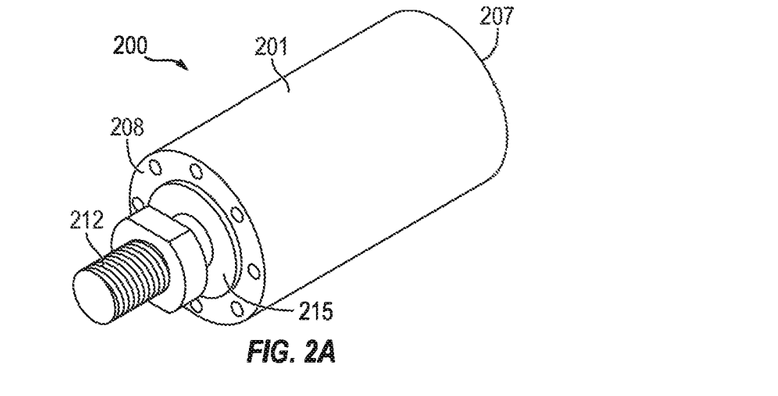
FIGS. 2A-2C are first and second perspective views and a cross-sectional view, respectively, of an isolator according to one embodiment of the present disclosure.
Figure 2B:
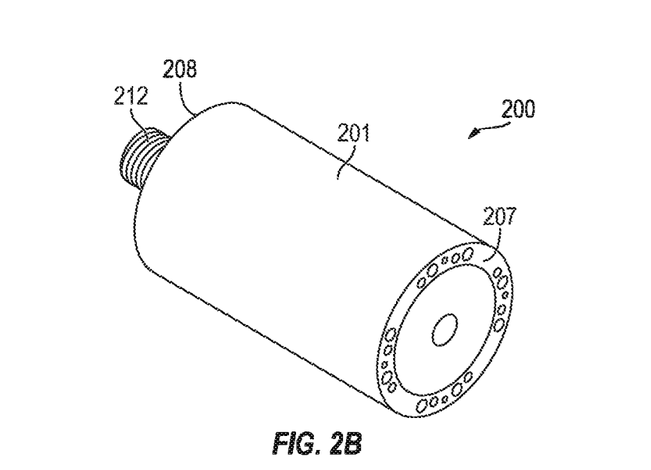
Figure 2C:
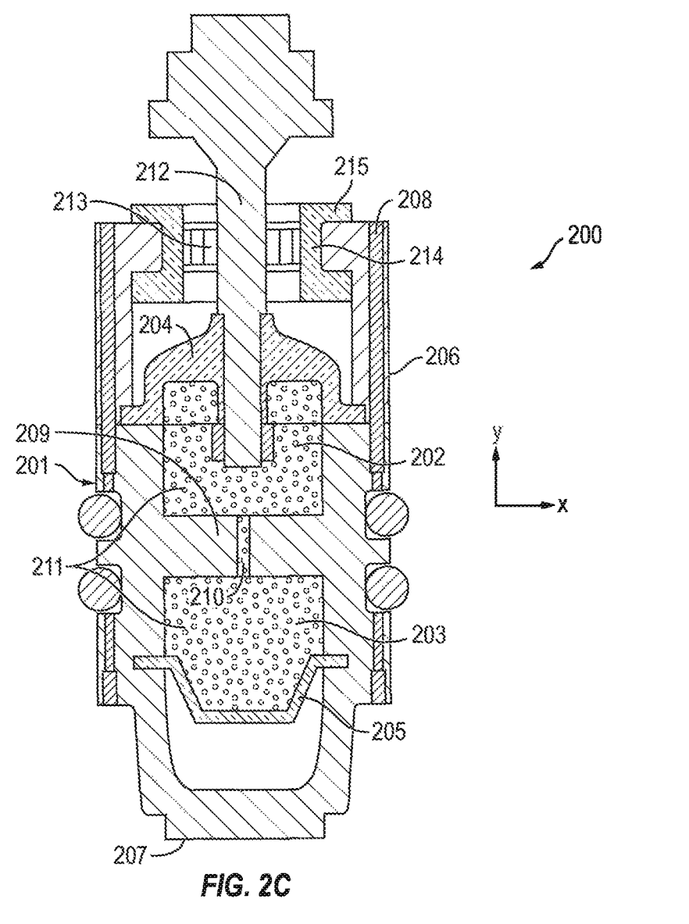

With reference now to FIGS. 2A-2C, an isolator 200 according to one embodiment of the present disclosure includes a case or a housing 201, a primary isolation chamber 202 in the housing 201, a backpressure chamber 203 in the housing 201, an elastomer dome 204 in the housing 201, and a backpressure membrane 205 in the housing 201. In the illustrated embodiment, the elastomer dome 204 and the backpressure membrane 205 are each dome-shaped members extending in opposite directions away from each other. In one or more embodiments, the backpressure membrane 205 may have any other suitable shape (e.g., the backpressure membrane 205 may not be dome-shaped). In one or more embodiments, the elastomer dome 204 and the backpressure membrane 205 are each made out of a resilient (e.g., elastic) material. In one or more embodiments, the elastomer dome 204 and the backpressure membrane 205 are made out of any suitable type or kind of elastomer, such as silicone elastomers (e.g., NuSil™ 5840), ethylene propylene rubber (EPM), ethylene propylene diene rubber (EPDM), ethylene-vinyl acetate EVA), thermoplastic elastomers (TPE), natural polyisoprene, synthetic polyisoprene, Buna-N rubber (nitrile rubber), or combinations thereof.

In the illustrated embodiment, the housing 201 includes a sidewall 206 (e.g., a cylindrical sidewall) extending between a first end 207 of the housing 201 and a second end 208 of the housing 201 opposite the first end 207. Although in the illustrated embodiment the housing 201 is generally cylindrical, in one or more embodiments the housing 201 may have any other shape suitable for the environment in which the isolator 200 is intended to be utilized (e.g., a missile body or an oil well) to attenuate unwanted vibrations and/or shock. For example, in one or more embodiments, the housing 207 may have a prismatic shape. In the illustrated embodiment, the backpressure chamber 203 is proximate to the first end 207 of the housing 201 and the primary isolation chamber 202 is proximate to the second end 208 of the housing 201.

With continued reference to the embodiment illustrated in FIG. 2C, the housing 201 includes a wall or partition 209 connected to the sidewall 206. The partition 209 is positioned at an intermediate position between the first and second ends 207, 208 of the housing 201. The partition 209 separates the backpressure chamber 203 from the primary isolation chamber 202. Additionally, in the illustrated embodiment, the partition 209 defines an opening 210 (e.g., a conduit) placing the primary isolation chamber 202 in fluid communication with the backpressure chamber 203. In the illustrated embodiment, the primary isolation chamber 202 is defined between the elastomer dome 204, the partition 209, and a portion of the sidewall 206 proximate to the second end 208 of the housing 201. In the illustrated embodiment, the backpressure chamber 203 is defined between the backpressure membrane 205, the partition 209, and a portion of the sidewall 206 proximate to the first end 207 of the housing 201.

With continued reference to the embodiment illustrated in FIG. 2C, the isolator 200 includes a volume of liquid 211 in the primary isolation chamber 202 and the backpressure chamber 203. In one or more embodiments, the liquid 211 contained in the primary isolation chamber 202 and the backpressure chamber 203 is oil (e.g., a high viscosity oil such as high viscosity mineral oil). The opening 210 defines a fluid path (e.g., a fluid track) placing the primary isolation chamber 202 in fluid communication with the backpressure chamber 203 such that the liquid 211 can flow between the primary isolation chamber 202 and the backpressure chamber 203.

In the illustrated embodiment, the first end 207 of the housing 201 is configured to be connected to a vibration source (e.g., a drill string). In one or more embodiments, an outer surface of the sidewall 206 at the first end 207 includes external threads and/or the first end 207 of the housing 201 may define a series of internally threaded openings configured to accommodate fasteners coupling the isolator 200 to the vibration source.

With continued reference to the embodiment illustrated in FIG. 2C, the isolator 200 also includes a shaft 212 connected to the elastomer dome 204. In the illustrated embodiment, the shaft 212 is connected to the housing 201 by the elastomer dome 204. In the illustrated embodiment, the shaft 212 extends out through an opening 213 in the second end 208 of the housing 201. The shaft 212 is configured to be connected to a payload, and the isolator 200 is configured to isolate the payload from unwanted vibrations and/or shocks transmitted to the housing 201 from the vibration source (i.e., the isolator 200 is configured to attenuate the transmission of unwanted vibrations from the vibration source to the payload connected to the shaft 212).

In operation, movement of the housing 201 caused by vibrations and/or a shock transmitted to the housing 201 of the isolator 200 causes the elastomer dome 204 to deflect (e.g., deform), which reduces or limits transmission of the vibrations and/or the shock to the payload connected to the shaft 212. That is, the deformable elastomer dome 204 effectively decouples the shaft 212 from the housing 201 to reduce the transmission of vibrations and/or shock to the payload connected to the shaft 212. In the illustrated embodiment, the elastomer dome 204 is configured to deflect both radially (e.g., the x-direction in FIG. 2C) and axially (e.g., the y-direction in FIG. 2C) to provide vibration isolation in all translational directions. In this manner, the elastomer dome 204 is configured to provide multi-axis damping to attenuate the transmission of the vibrations and shocks to the isolated payload through the shaft 212. In the illustrated embodiment, the elastomer dome 204 is also configured to deflect rotationally about the axial direction (e.g., rotationally around the y-axis in FIG. 2C) to provide vibration isolation in a rotational direction. The configuration of the elastomer dome 204 (e.g., the geometry of the elastomer dome 204, including the shape, size, and thickness of the elastomer dome 204) and the material properties of the elastomer dome 204 (e.g., the material, hardness, and stiffness of the elastomer dome 204) may be selected depending on the magnitude of the vibrations and/or the shock input to the housing 201 from the vibration source and/or the desired degree of vibrational isolation provided to the payload connected to the shaft 212.

Additionally, when vibrations and/or a shock (or at least a component thereof) is imparted to the housing 201 along the axial direction of the housing 201 (e.g., the +y-direction in FIG. 2C), at least a portion the elastomer dome 204 deflects axially in the direction of the first end 207 of the housing 201 (e.g., the −y-direction in FIG. 2C). The deflection of the elastomer dome 204 in the direction of the first end 207 of the housing 201 reduces the volume of the primary isolation chamber 202 and thereby increases the pressure of the liquid 211 in the primary isolation chamber 202. A volume of liquid 211 in the primary isolation chamber 202 corresponding to the volume of liquid 211 in the primary isolation chamber 202 that was displaced by the deflection or deformation of the elastomer dome 204 is forced through the opening 210 (e.g., the conduit) in the partition 209 into the backpressure chamber 203. In this manner, the elastomer dome 204 is configured to function as a piston to pump a volume of the liquid 211 in the primary isolation chamber 202 to the backpressure chamber 203 through the opening 210 in response to vibrations and/or a shock imparted to the housing 201 of the isolator 200.

The backpressure membrane 205 is configured to deflect and/or deform (e.g., in the direction of the first end 207 of the housing 201) in response to the influx of additional liquid 211 into the backpressure chamber 203 (e.g., the backpressure membrane 205 is configured to expand axially in the direction of the first end 207 of the housing 201, which increases the size of the backpressure chamber 203 to accommodate the influx of additional liquid 211). The deflection or deformation of the backpressure membrane 205 in the axial direction (e.g., the negative y-direction in FIG. 2C) toward the first end 207 of the housing 201 due to the influx of an additional volume of liquid 211 into the backpressure chamber 203 provides fluidic damping (e.g., hydraulic damping) along the axial direction (e.g., the y-axis in FIG. 2C) of the shaft 212.

Additionally, in the illustrated embodiment, the cross-sectional size of the opening 210 in the partition 209 (e.g., the conduit) is smaller than the cross-sectional size of the chambers 202, 203 such that the opening 210 restricts the flow of the fluid between the primary chamber 202 and the backpressure chamber 203. This restriction of the liquid flow through the opening 210 is configured to provide fluidic damping to limit the transmission of vibrations and/or shock to the payload connected to the shaft 212. The configuration (e.g., shape and size) of the opening 210 in the partition 209 may be selected depending on the magnitude of the vibrations and/or shock input to the housing 201 from the vibration source and/or the desired level of fluidic damping. In one or more embodiments, the stiffness of the elastomer dome 204 is sufficiently soft to provide multi-axis damping, but stiff enough to pump a volume of the liquid 211 from the primary isolation chamber 202 to the backpressure chamber 203 through the opening 210 in the partition 209.

Additionally, the deflection and/or deformation of the backpressure membrane 205, which is formed of a resilient (e.g., elastic) material, generates a restorative force in an axial direction (e.g., the positive y-direction in FIG. 2C) opposite to the direction in which the backpressure membrane 205 was deflected and/or deformed. This restorative force is configured to force (e.g., pump) a volume of the liquid 211 in the backpressure chamber 203 back through the opening 210 in the partition 209 into the primary isolation chamber 202. The restorative force supplied by the deflected backpressure membrane 205 is configured to force a volume of the liquid 211 into the primary isolation chamber 202 through the opening 210 until the pressure of the liquid 211 in the primary isolation chamber 202 substantially equals the pressure of the liquid 211 in the backpressure chamber 203 (e.g., the deflection and/or deformation of the backpressure membrane 205 is configured to change the pressure of the liquid 211 in the backpressure chamber 203 until a pressure equilibrium is reached between the liquid 211 in the primary isolation chamber 202 and the backpressure chamber 203). This cycle of pumping the liquid 211 between the primary isolation chamber 202 and the backpressure chamber 203 through the opening 210 in the partition 209 may continue as long as unwanted vibrations and/or shock are input to the housing 201 of the isolator 200 in order to provide fluidic damping to attenuate the transmission of the vibrations and/or the shocks to the isolated payload coupled to the shaft 212.

Accordingly, the embodiment of the isolator 200 illustrated in FIGS. 2A-2C is configured to provide both multi-axis isolation (e.g., translational and rotational isolation) due to the elastomer dome 204 being coupled between the housing 201 and the shaft 212, and fluidic damping (e.g., hydraulic damping) along the axial direction (e.g., the y-axis in FIG. 2C) due to the pumping of the liquid 211 between the chambers 202, 203 through the opening 210 (e.g., the conduit) in the partition 209.

Additionally, in the embodiment illustrated in FIG. 2C, the isolator 200 includes a lateral bump stop contact 214 and an axial bump stop contact 215. In the illustrated embodiment, the bump stop contacts 214, 215 are coupled to the housing 201 proximate to the second end 208 of the housing 201. In the illustrated embodiment, the lateral bump stop contact 214 extends around an interior circumference of the opening 213 at the second end 208 of the housing 201 and extends radially inward from the sidewall 206 of the housing 201 (e.g., the annular bump contact 214 is an annular member extending radially inward from the sidewall 206 of the housing 201). Accordingly, the lateral bump stop contact 214 is spaced apart from and extends around a portion of the shaft 212. The lateral bump stop contact 214 is configured to prevent lateral contact between the shaft 212 and the housing 201 (e.g., the sidewall 206 of the housing 201), which might otherwise occur if the housing 201 is subjected to large amplitude lateral vibrations and/or large amplitude lateral shocks. In the illustrated embodiment, the axial bump stop contact 215 is an annular member extending around the second end 208 of the housing 201. The axial bump stop contact 215 is configured to prevent axial contact between the shaft 212 and the second end 208 of the housing 201, which might otherwise occur if the housing 201 is subjected to large amplitude axial vibrations and/or axial shock. Accordingly, the lateral bump stop contact 214 and the axial bump stop contact 215 are configured to prevent lateral and axial contact, respectively, between the shaft 212 and the housing 201 which would transmit unwanted vibrations to the payload coupled to the shaft 212. In the illustrated embodiment, the lateral bump stop contact 214 and the axial bump stop contact 215 are integrally formed from a single, monolithic component extending around the second end 208 of the housing 201. In one or more embodiments, the lateral bump stop contact 214 and the axial bump stop contact 215 may be separate components. The configuration of the bump stop contacts 214, 215 (e.g., the size and thickness) and the material of the bump stop contacts 214, 215 (e.g., the hardness or durometer) may be selected depending on the amplitude of the vibration and/or shock events in the environment in which the isolator 200 will be utilized, and the desired damping provided by the bump stop contacts 214, 215 in the event of large amplitude axial and/or lateral vibrations and/or shocks. In one or more embodiments, the bump stop contacts 214, 215 may be made out of an elastic material. Although in the illustrated embodiment the bump stop contacts 214, 215 are separate components, in one or more embodiments, the lateral bump stop contact 214 and the axial bump stop contact 215 may be integrally provided in a single component.

Figure 3:
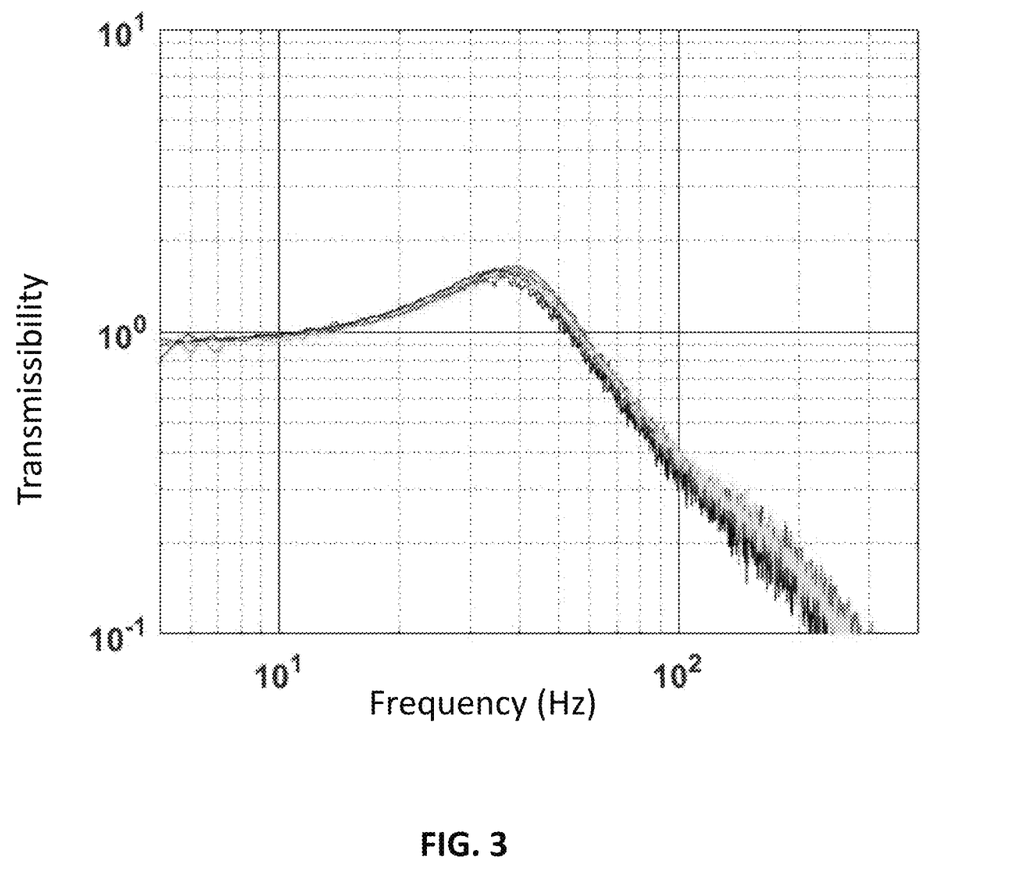
FIG. 3 is a graph depicting the transmissibility of vibrations through an isolator according to one embodiment of the present disclosure as a function of the frequency of the vibrations.

FIG. 3 depicts the transmissibility of vibrations through an isolator 100, 200 according to one embodiment of the present disclosure as a function of the vibration frequency. In one or more embodiments, the isolator 100, 200 has a relatively low resonant frequency of approximately 40 Hz or less and a damping ratio of approximately 0.4. In one or more embodiments, the isolator 100, 200 may have any other damping ratio suitable for the environment in which the isolator 100, 200 is intended to be utilized and/or the nature of the isolated payload, such as, for instance, a damping ratio greater than approximately 0.4 or less than approximately 0.4. An isolator according to one or more embodiments of the present disclosure was tested by subjecting the isolator to vibration levels up to approximately 18 $g_{rms}$ at frequencies from approximately 20 Hz to approximately 200 Hz. The tested isolator achieved a travel of approximately +/−0.25 inches in the axial and radial directions, which demonstrates that the isolator provided adequate damping of unwanted vibrations under these conditions.

Figure 4:
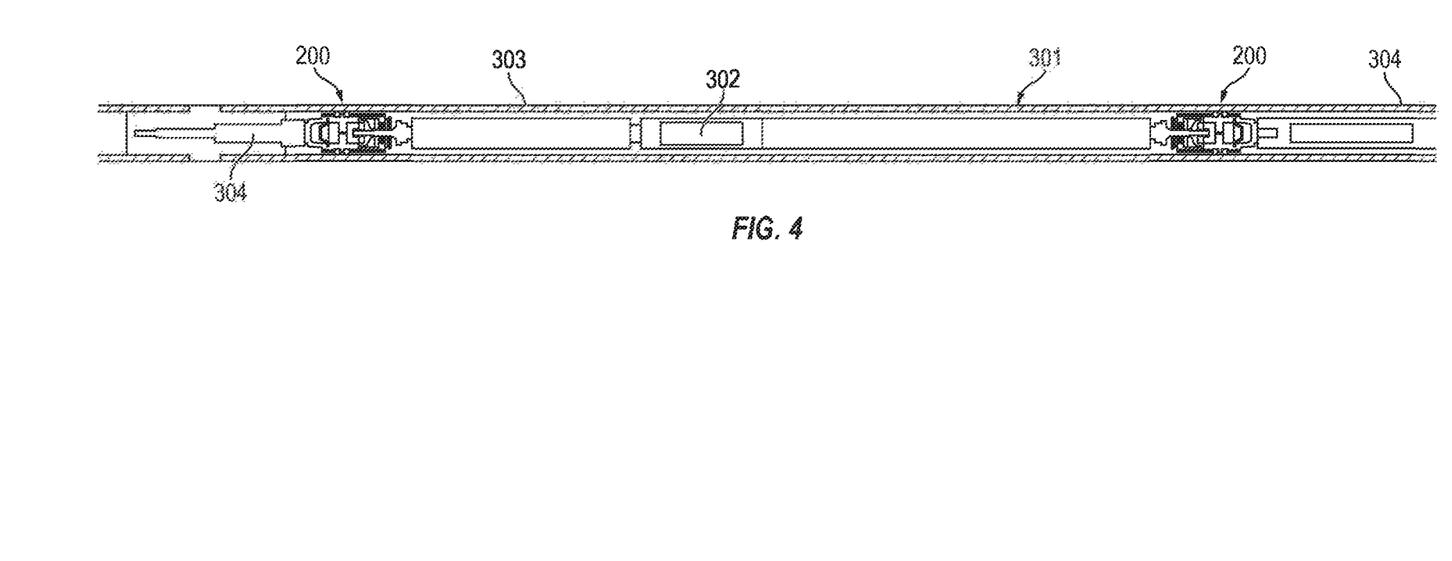
FIG. 4 is a cross-sectional view illustrating two isolators according to the embodiment in FIGS. 2A-2C utilized in a well casing to isolate a sensor chassis from unwanted vibrations.

FIG. 4 depicts two isolators according to one or more embodiments of the present disclosure (e.g., the isolator 100 illustrated in FIG. 1 or the isolator 200 illustrated in FIGS. 2A-2C) utilized in a petroleum drill well 301 to isolate a sensor chassis 302 containing one or more sensors from unwanted vibrations and/or shocks. In the illustrated embodiment, the isolators 100, 200 are connected to opposite ends of the sensor chassis 302. The isolators 100, 200 are configured to attenuate unwanted vibrations from a pressure casing 303 rigidly connected to a vibrating drill string 304 of the petroleum drill well 301. The isolators 100, 200 are configured to allow the sensor chassis 302 to translate and/or rotate with the pressure casing 303 with a prescribed amount of stiffness and damping such that desired degrees of freedom of motion of the sensor chassis 302 are isolated from the vibration of the drill string 304 and the pressure casing 303 rigidly connected thereto. In one or more embodiments, the isolators 100, 200 of the present disclosure may be utilized to isolate any other component or components from unwanted vibrations (e.g., the isolators 100, 200 may be utilized to isolate sensitive electronic payloads, such as sensor suites in missile bodies).

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "outer," "inner," "upper," "lower," and similar terms have been used herein to describe a spatial relationship of one element to another, it is understood that these terms are intended to encompass different orientations of the various elements and components of the invention in addition to the orientation depicted in the figures. Additionally, as used herein, the term "substantially," "about," and similar terms are used as terms of approximation and not as terms of degree, and are intended to account for the inherent deviations in measured or calculated values that would be recognized by those of ordinary skill in the art. Moreover, the tasks described above may be performed in the order described or in any other suitable sequence. Additionally, the methods described above are not limited to the tasks described. Instead, for each embodiment, one or more of the tasks described above may be absent and/or additional tasks may be performed. Furthermore, as used herein, when a component is referred to as being "on" another component, it can be directly on the other component or components may also be present therebetween. Moreover, when a component is component is referred to as being "coupled" to another component, it can be directly attached to the other component or intervening components may be present therebetween.

What is claimed is:

1. An isolator configured to isolate a payload from unwanted vibrations and shocks, the isolator comprising:
 a housing having a first end and a second end opposite the first end;
 a primary chamber defined in the housing;
 a backpressure chamber defined in the housing;
 a conduit placing the primary chamber in fluid communication with the backpressure chamber;
 a backpressure membrane in the housing proximate the first end;
 an elastomer dome in the housing proximate the second end, wherein the primary chamber and the backpressure chamber are between the backpressure membrane and the elastomer dome; and a shaft connected only to the elastomer dome of the group consisting of the elastomer dome and the backpressure membrane, the shaft configured to be connected to the payload, wherein the backpressure membrane is resilient, and wherein deformation of the backpressure membrane in an axial direction is to generate a restorative force in the backpressure membrane in a direction opposite to the axial direction.

2. The isolator of claim 1, further comprising a liquid in the primary chamber and the backpressure chamber, and wherein, when vibrations or shocks are transmitted to the housing:

the elastomer dome deflects to attenuate the vibrations or the shocks reaching the payload through the shaft, the deflection of the elastomer dome forces a volume of the liquid in the primary chamber through the conduit into the backpressure chamber, and an influx of the volume of the liquid into the backpressure chamber deflects the backpressure membrane, and the deflection of the backpressure membrane generates a restorative force configured to force a volume of the liquid in the backpressure chamber into the primary chamber through the conduit.

3. The isolator of claim 1, wherein the housing comprises a partition separating the primary chamber from the backpressure chamber, and wherein the conduit is an opening defined in the partition.

4. The isolator of claim 1, further comprising a liquid in the primary chamber and the backpressure chamber.

5. The isolator of claim 4, wherein the liquid is oil.

6. The isolator of claim 1, wherein the backpressure membrane comprises a resilient material.

7. The isolator of claim 6, wherein the resilient material is silicone elastomer.

8. The isolator of claim 1, further comprising a lateral bump stop connected to the second end of the housing, the lateral bump stop extending inward from the housing toward the shaft.

9. The isolator of claim 1, further comprising an axial bump stop connected to the housing.

10. An isolator, comprising:
a primary chamber;
a backpressure chamber;
a housing, wherein the backpressure chamber and the primary chamber are in the housing;
a conduit extending between the primary chamber and the backpressure chamber, the conduit placing the primary chamber in communication with the backpressure chamber;
a backpressure membrane defining at least a portion of the backpressure chamber; and an elastomer dome defining at least a portion of the primary chamber, wherein a first portion of the elastomer dome is fixedly coupled to the housing such that the first portion of the elastomer dome is configured not to move relative to the housing during operation of the isolator, wherein a second portion of the elastomer dome is configured to deflect both radially and axially relative to the housing during operation of the isolator wherein the backpressure membrane is resilient, and wherein deformation of the backpressure membrane in an axial direction is to generate a restorative force in the backpressure membrane in a direction opposite to the axial direction.

11. The isolator of claim 10, further comprising a liquid in the primary chamber and the backpressure chamber.

12. The isolator of claim 11, wherein the liquid is oil.

13. The isolator of claim 10, further comprising a shaft coupled to the elastomer dome, the shaft extending through an opening in the housing and configured to be connected to a payload.

14. The isolator of claim 13, further comprising a lateral bump stop coupled to housing, the lateral bump stop extending inward from the housing toward the shaft.

15. The isolator of claim 13, further comprising an axial bump stop coupled to an end of the housing.

16. The isolator of claim 10, wherein the housing further comprises a partition, and wherein the conduit is an opening defined in the partition.

17. A method of isolating a payload from unwanted vibrations and shocks, the method comprising:

radially and axially deforming an elastomer dome disposed between a vibration source and the payload to provide multi-axis damping;

pumping a volume of liquid from a first chamber to a second chamber through a conduit with the elastomer dome to provide fluidic damping; and deforming, in an axial direction, a backpressure membrane defining at least a portion of the second chamber, wherein the backpressure membrane is resilient, and wherein the deforming of the backpressure membrane in the axial direction is to generate a restorative force in the backpressure membrane in a direction opposite to the axial direction.

18. The method of claim 17, further comprising pumping a volume of the liquid from the second chamber to the first chamber with a backpressure membrane.

19. The method of claim 17, wherein the liquid is mineral oil.

* * * * *